United States Patent [19]

Hashizume et al.

[11] Patent Number: 4,631,619
[45] Date of Patent: Dec. 23, 1986

[54] MAGNETIC TAPE CASSETTE HAVING IMPROVED REEL LOCKING MEANS

[75] Inventors: Kenji Hashizume; Haruo Shiba; Masatoshi Okamura, all of Saku, Japan

[73] Assignee: TDK Corporation, Tokyo, Japan

[21] Appl. No.: 703,438

[22] Filed: Feb. 20, 1985

[30] Foreign Application Priority Data

Mar. 7, 1984 [JP] Japan .............................. 59-31713[U]

[51] Int. Cl.$^4$ ...................... G11B 23/02; G11B 15/32; G11B 23/04; G03B 1/04
[52] U.S. Cl. ..................................... 360/132; 242/198
[58] Field of Search .................. 360/96.1, 96.3, 132; 242/197, 198, 199

[56] References Cited

U.S. PATENT DOCUMENTS 4,473,202 9/1984 Verhoeven .......................... 242/198
4,496,119 1/1985 Sieben ................................. 360/132

Primary Examiner—Robert S. Tupper
Assistant Examiner—Melissa J. Koval
Attorney, Agent, or Firm—Oblon, Fisher, Spivak, McClelland, & Maier

[57] ABSTRACT

A magnetic tape cassette comprises a locking means which is slidably placed between a locking position of coming into engagement with a pair of reels held in the magnetic tape cassette and a releasing position of disengagement from the reels. The locking means is provided with a pair of flexible pawls which are curved in an arch form in the direction of separation from each other; a guide rib is fixed to the inner bottom surface of a cassette casing and between the pair of flexible pawls, the width of the guide rib being decreased toward the root of the pair of flexible pawls; and a pair of guide pins are provided at the outside of the pair of flexible pawls.

4 Claims, 9 Drawing Figures

MAGNETIC TAPE CASSETTE HAVING IMPROVED REEL LOCKING MEANS

BACKGROUND OF THE INVENTION

1. Field of the Invention

The present invention relates to a magnetic tape cassette. Particularly, it relates to a magnetic tape cassette provided with a locking means for locking reels.

2. Description of Prior Art

There has so far been provided in a magnetic tape cassette, especially, in a video tape cassette a locking means for locking rotation of reels held in the tape cassette during non-use, for the purpose of preventing rewinding of the magnetic tape during preservation during non-use and transportation of the tape cassette.

FIG. 1 shows a conventional locking means. In the figure, a pair of reels 5, 7 for a magnetic tape 3 are put in a magnetic tape cassette body which is constituted by an upper half casing (not shown) and a lower half casing 1. The shaft of each of the reels 5, 7 is loosely fitted to a pair of through holes 9, 11 formed in the lower half casing 1 respectively. Each shaft is adapted to be driven by a driving shaft extending upwardly from a magnetic tape recorder. The outer peripheral edges of the lower flanges 13, 15 of the reels 5, 7 are respectively provided with saw-teeth like notches 14, 16. In the central part of the back wall 17 of the lower half casing 1, there are formed a pair of guide pieces 19, 21 between which a guiding channel 23 is formed extending between the front and back of the magnetic tape cassette. In the guiding channel 23, a locking means 27 is fitted with its rear part being pushed forwardly by a spring 25 as shown in FIG. 1 so that when the magnetic tape cassette is mounted on the tape recorder, the locking means 27 is slidingly moved backward. A pair of flexible pawls 29, 31 having elasticity are fitted to, or formed integrally with, the front part of the locking means 27. The flexible pawls are adapted to be normally opened in the directions shown by arrow marks. The opening of the flexible pawls 29, 31 is restricted by means of a pair of pins 33, 35 provided in the front of the guiding channel 23 of the lower half casing 1. When the magnetic tape cassette is not mounted on the tape recorder, the spring 25 pushes the locking means 27 forwardly open the flexible pawls 29, 31 so that the flexible pawls are engaged with the saw-teeth like notches 14, 16 of the lower flanges 13, 15 of the reels 5, 7. When the magnetic tape cassette is mounted on the tape recorder, the locking means is pushed backwardly by an operating means extending from a through hole formed in the bottom surface of the locking means 27 in the lower half casing 1. Backward movement of the locking means releases engagement of the flexible pawls with the reels 5, 7 and the pins 33, 35 close the flexible pawls inwardly.

Magnetic tape cassettes are often left for a long time while they are mounted on tape recorders, on account of which there results thermal deformation in the flexible pawls 29, 31 of the locking means in the closing state under application of stress. Accordingly, when the locking means is returned to the locking position, function of engagement of the flexible pawls to the reels may not be attained. In such cases, there results a trouble that a wound magnetic tape becomes loose and fitting operation of the magnetic tape to a tape running system of a tape recorder can not be performed smoothly.

The present inventors have previously proposed construction of a locking means having reliable function regardless of permanent deformation in the flexible pawls in Japanese Utility Model Application No. 4205/1984 corresponding to copending U.S. patent application Ser. No. 691,891 now U.S. Pat. No. 4,585,187, to eliminate the above-mentioned problem. Namely, the problem has been solved by providing a locking means 39 having a pair of flexible pawls 41, 43, the opposing surfaces of the pawls being provided with cylindrical raised portions 45, while a guide rib 51 having tapered guide surfaces 53, 55 is positioned in front of a pair of pins 33, 35 as shown in FIGS. 2, 3.

FIG. 2 shows a state of the locking means when a magnetic tape cassette is in use (it is mounted on a tape recorder). In this state, even though there results permanent deformation in the flexible pawls 41, 43 by a compressive force of the pins 33, 35, the pawls 41, 43 can be forcibly opened by the contacting of the raised portions 45, 45 with the guide surfaces 53, 55 of the guide rib 51 when the locking means is advanced (when the tape cassette is removed from the tape recorder) whereby the top ends of the pawls 41, 43 can be engaged with the saw-teeth like notches 14, 16 of the reels. In the locking means having the above-mentioned system, however, it has been found that satisfactorily smooth movement of the locking means can not be attained. More specifically, in FIGS. 2 and 3, the flexible pawls 41, 43 are always in contact with pins 33, 35 while the top ends of the pawls and the raised portions 45, 45 are brought into contact with the tapered surfaces 53, 55 at the time of advancing, with the result that compressive forces act on the pawls from the inside and the outside to cause a large frictional force whereby resistance against movement of the locking means becomes large, hence smoothing movement of the locking means is hindered.

SUMMARY OF THE INVENTION

It is an object of the present invention to provide a magnetic tape cassette with a locking means which assures constant locking effect for a long time period and allows smooth movement with a reduced frictional force.

The foregoing and the other objects of the present invention have been attained by providing a magnetic tape cassette comprising a locking means slidably placed between a locking position of coming into engagement with a pair of reels held in the magnetic tape cassette and a releasing position of disengagement from the reels, characterized in that the locking means is provided with a pair of flexible pawls which are curved in an arch form in the direction of separation; a guide rib is fixed to the inner bottom surface of a cassette casing and between the pair of flexible pawls, the width of the guide rib being decreased toward the root of the pair of flexible pawls; and a pair of guide pins are provided at the outside of the pair of flexible pawls, whereby when the locking means is advanced to the locking position, the flexible pawls are forcibly opened by the tapered surfaces of the guide rib to be engaged with the reels and when the locking means is retracted to the releasing position, the flexible pawls are forcibly closed by the guide pins.

In the preferred embodiment of the locking means according to the present invention, the guide rib is provided at both sides with tapered surfaces and the fexible pawls have elasticity, on account of which the flexible pawls of the locking means impart uniform function for locking and releasing of the reels by the aid of the tapered surfaces of the guide ribs and pins. In addition, a contacting force against the guide rib and pins is reduced, thereby imparting smooth operation and preventing erroneous function of the locking means, hence reliable locking operation can be obtained.

DETAILED DESCRIPTION OF PREFERRED EMBODIMENT

An embodiment of the present invention will be described with reference to drawing.

Figure 1:
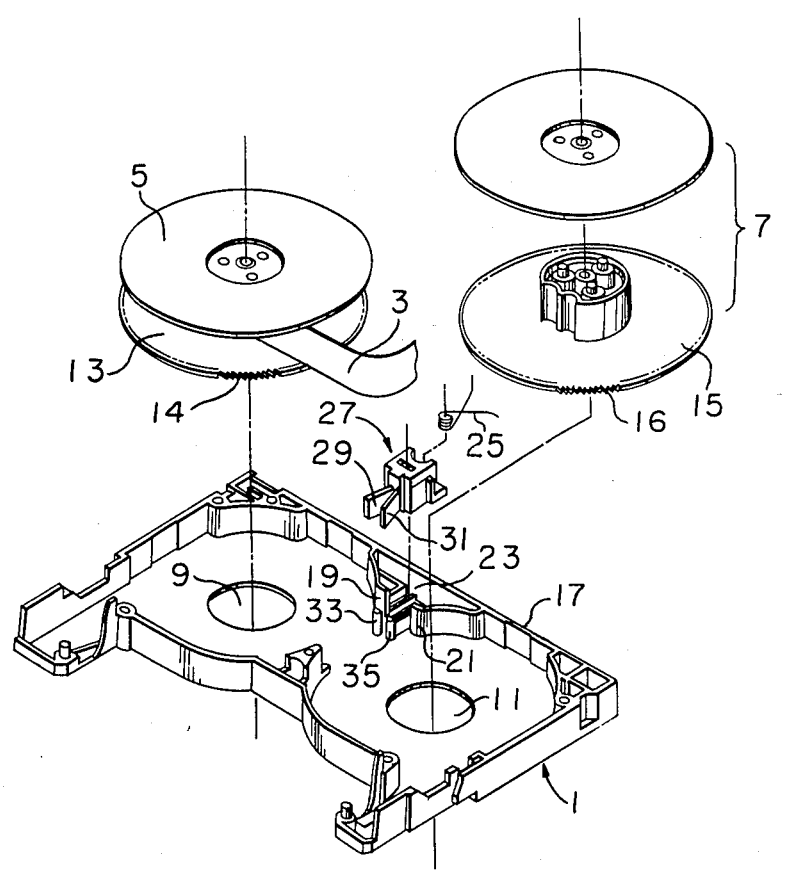
FIG. 1 is a perspective view in a disassembled state of a previously proposed magnetic tape cassette.
Figure 2:
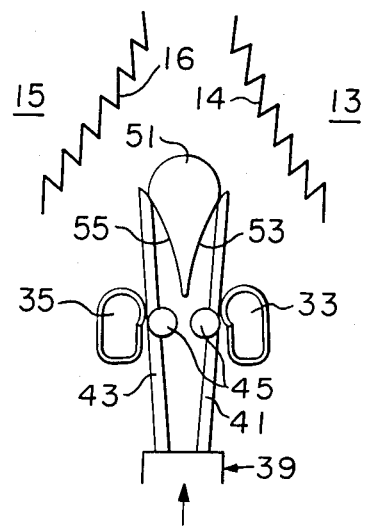
FIG. 2 is a schematic view of the locking means and a guide rib.
Figure 3:
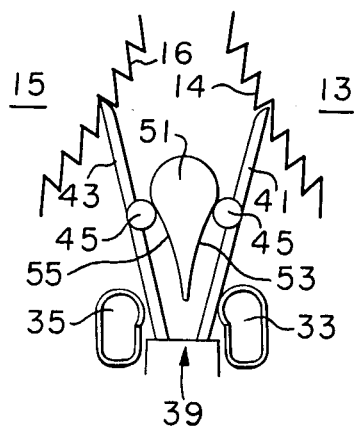
FIG. 3 is a schematic view of the locking means in FIG. 2 in a locking state.
Figure 4:
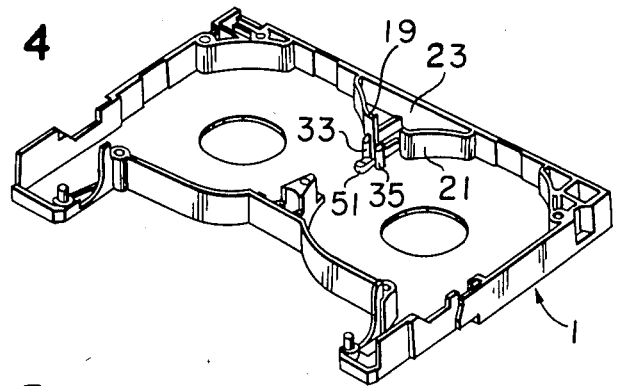
FIG. 4 is a perspective view of an embodiment of the lower half casing of the magnetic tape cassette according to the present invention.

FIG. 4 is a perspective view of a lower half casing of the magnetic tape cassette according to the present invention. In the tape cassette of FIG. 4, the present invention provides an improved locking means.

The saw-teeth like notches 14, 16 formed in the outer peripheral edges of the lower flanges 13, 15 of the reels 5, 7 are so designed as to block rotation of reels in the direction of feeding the magnetic tape, but to allow rotation in the direction of winding of it, whereby looseness of the magnetic tape 3 is regulated by hand operation even in a locking state.

Figure 5:
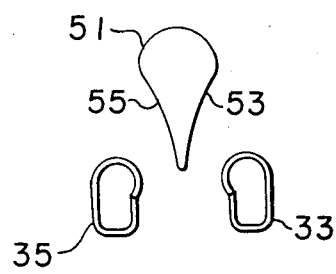
FIG. 5 is a diagram showing an arrangement of the important parts of the present invention.

In FIG. 4, a pair of guide pins 33, 35 are provided at the front of a guiding channel 23 for receiving a locking means 39, which is formed at the central part of the back wall of the lower half casing 1 and a guide rib 51 having tapered surfaces 53, 55 at both sides of it is fixed on the bottom surface of the lower half casing 1 in the front of and at the center of the pair of guide pins 33, 35 (FIG. 5). The locking means 39, which will be described below in detail, is placed in such a manner that it is fitted in the guiding channel 23 and is always pushed by the action of a spring 25, and a pair of flexible pawls 41, 43 are arranged between the pins 33, 35 and the guide rib 51.

Figure 6:
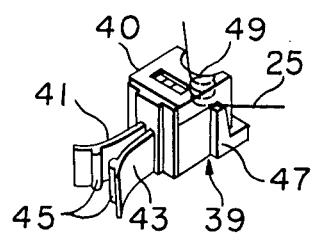
FIG. 6 is a perspective view of the locking means of the present invention.
Figure 7:
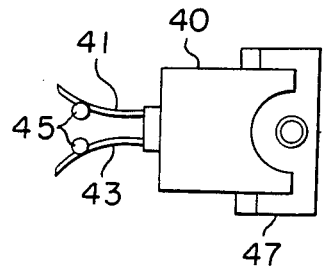
FIG. 7 is a plan view of the locking means.

As shown in FIGS. 6 and 7, the locking means 39 has a sliding member 40 inserted in the guiding channel 23 so as to be slidable. The pair of flexible pawls 41, 43 are fitted to the front surface of the sliding member 40 with their free ends being slightly opened and the flexible pawls 41, 43 respectively have vertically extending raised portions 45 in their facing surfaces. Stoppers 47 are formed in both side surfaces of the sliding member 40 to serve as detents for the forward movement of the locking means by contacting the guide members 19, 21 of the lower half casing. A recess 49 is formed in the rear surface of the sliding member 40 to receive the spring 25. The flexible pawls 41, 43 are curved in a substantially arch form in the direction separating from each other as shown in FIGS. 6 and 7. The flexible pawls 41, 43 are so dsigned that the distance between the root portions is narrower than the distance between the guide pins 33, 35 when the locking means is forwardly shifted by the action of the spring 25 and on the other hand, the front end parts of the flexible pawls are sufficiently separated from the guide rib 51 when the locking means is retracted against the spring action. Such arrangement of the flexible pawls 41, 43 can be realized by curving the flexible pawls in a substantially arch form.

Figure 8:
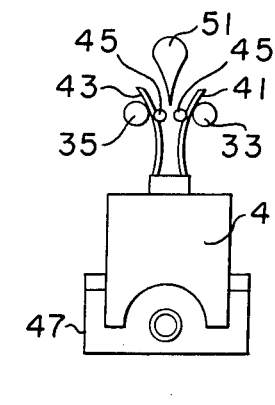
FIG. 8 is a plan view of the locking means in a releasing state.

The operation of the locking means according to the present invention will be described with reference to FIGS. 8 and 9. FIG. 8 shows a state of the locking means (a position where locking condition is released) when a magnetic tape cassette is mounted on a tape recorder and FIG. 9 shows a state of the locking means (a locking position) when the magnetic tape cassette is not mounted on the tape recorder.

As shown in FIG. 8, when the locking means 39 is in the releasing position, the flexible pawls 41, 43 are closed by the guide pins 33, 35. When the magnetic tape cassette is removed from the tape recorder, the locking means 39 is moved forwardly to the locking position as shown in FIG. 9 by the action of the spring 25. Then, the flexible pawls 41, 43 are brought into contact with the tapered surfaces 53, 55 of the guide rib 51 fixed in the front of the locking means to be forcibly opened. More specifically, the raised portions 45, 45 are first brought into contact with the tapered surfaces 53, 55 then, they slide on and along the tapered surfaces 53, 55 smoothly whereby the top ends of the flexible pawls 41, 43 are engaged with the saw-teeth like notches 14, 16 formed in the outer peripheral edges of the lower flanges 13, 15.

When the magnetic tape cassette is mounted on the tape recorder, the locking means 39 is operated by an element of the tape recorder to be moved to the releasing position as shown in FIG. 7. At this movement, the flexible pawls 41, 43 are, on one hand, guided by the tapered surfaces 53, 55 of the guide rib 51 and are, on the other hand, pushed by the guide pins 33, 35 from outer sides to be closed.

Figure 9:
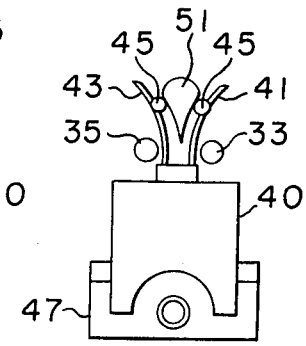
FIG. 9 is a plan view of the locking means in a locking state.

With the provision of the flexible pawls 41, 43 having the arched curve, the flexible pawls 41, 43 are entirely separated from the guide pins 33, 35 as soon as the locking means begins to move from the releasing position as shown in FIG. 8 to the locking position as shown in FIG. 9, during which the flexible pawls do not contact with the guide rib 51. While the raised portions 45, 45 are guided by and move along the guide rib 51 and at the time of when the locking means is in a locking position, the guide pins 33, 35 do not act on the flexible pawls. Conversely, the locking means is moved from the locking position as shown in FIG. 9 to the releasing position as shown in FIG. 8, the flexible pawls are soon separated from the guide rib 51 and then brought into contact with the guide pins 33, 35. In the operations as above-mentioned, resistance of friction can be greatly reduced because there is no simultaneous contact between the flexible pawls and the rib 51 and between the flexible pawls and pins 33, 35. Further, the stroke of contact between the flexible pawls 41, 43 and the rib 51 and between the flexible pawls and pins 33, 35 is small and accordingly, the movement of the locking means can be smooth, hence erroneous movement can be prevented.

What is claimed is:

1. A magnetic tape cassette comprising:
a locking means slidably placed between a locking position of coming into engagement with a pair of reels held in said magnetic tape cassette and a releasing position of disengagement from said reels;
a pair of flexible pawls which are fixed to said locking means and are curved in an arch form in a direction of separation from each other
a tapered guide rib fixed to an inner bottom surface of a cassette casing and between said pair of flexible pawls, the width of said guide rib decreasing toward a root of said pair of flexible pawls; and
a pair of fixed guide pins provided at opposite sides of said pair of flexible pawls in said direction of separation, whereby when said locking means is advanced to said locking position, said flexible pawls are forcibly opened by tapered surfaces of said guide rib and engage with said reels and when said locking means is retracted to said releasing position, said flexible pawls are forcibly closed by said guide pins.

2. The magnetic tape cassette according to claim 1, wherein said guide rib has side surfaces which are symmetrically tapered about a center line thereof.

3. The magnetic tape cassette according to claim 1, wherein said pawls are provided with raised portions at positions in contact with said guide rib.

4. The magnetic tape cassette according to claim 3, wherein said raised portions are formed in opposing facing surfaces of said flexible pawls.